(12) United States Patent
Majahan et al.

(10) Patent No.: US 8,555,009 B1
(45) Date of Patent: Oct. 8, 2013

(54) METHOD AND APPARATUS FOR ENABLING AND MANAGING APPLICATION INPUT/OUTPUT ACTIVITY WHILE RESTORING A DATA STORE

(75) Inventors: Sameer Majahan, Pune (IN); Robert W. Perry, Leominster, MA (US); Srikant Sharma, Santa Clara, CA (US); Taher Vohra, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 683 days.

(21) Appl. No.: 12/533,764

(22) Filed: Jul. 31, 2009

(51) Int. Cl.
*G06F 12/00* (2006.01)

(52) U.S. Cl.
USPC .................................. 711/162; 711/E12.103

(58) Field of Classification Search
USPC ......................................................... 711/162
See application file for complete search history.

(56) References Cited

U.S. PATENT DOCUMENTS

| | | | |
|---|---|---|---|
| 6,742,138 B1 * | 5/2004 | Gagne et al. | 714/6.31 |
| 6,804,690 B1 * | 10/2004 | Dysert et al. | 1/1 |
| 6,868,506 B2 * | 3/2005 | Gagne et al. | 714/6.31 |
| 6,968,347 B2 * | 11/2005 | Gagne | 707/684 |
| 7,149,787 B1 * | 12/2006 | Mutalik et al. | 709/217 |
| 7,310,743 B1 * | 12/2007 | Gagne et al. | 714/6.31 |
| 7,444,420 B1 * | 10/2008 | Mutalik et al. | 709/231 |
| 8,015,377 B2 * | 9/2011 | Kano | 711/162 |
| 2002/0120605 A1 * | 8/2002 | Gagne | 707/1 |
| 2003/0140070 A1 * | 7/2003 | Kaczmarski et al. | 707/204 |
| 2004/0193950 A1 * | 9/2004 | Gagne et al. | 714/6 |
| 2005/0066222 A1 | 3/2005 | Rowan et al. | |
| 2005/0076264 A1 | 4/2005 | Rowan et al. | |
| 2005/0216462 A1 * | 9/2005 | Xiao | 707/8 |
| 2006/0101204 A1 * | 5/2006 | Bao | 711/114 |
| 2006/0161810 A1 * | 7/2006 | Bao | 714/6 |
| 2011/0055498 A1 * | 3/2011 | Kano | 711/156 |
| 2012/0198191 A1 * | 8/2012 | Kano | 711/162 |

* cited by examiner

*Primary Examiner* — Kevin Verbrugge
(74) *Attorney, Agent, or Firm* — Campbell Stephenson LLP

(57) ABSTRACT

A method and apparatus for enabling and managing application input/output activity in memory to restore a data store using one or more processors is disclosed. In one embodiments, the method includes processing a restoration request for a data store, wherein the data store is mirrored by another data store, controlling communication of application input/output activity associated with at least one host computer and directed to at least one of the data store or the other data store, restoring various portions of the data store, in accordance with the restoration request, using at least one of at least one prior point in time image or the other data store and servicing the application input/output activity using the data store.

21 Claims, 6 Drawing Sheets

US 8,555,009 B1

METHOD AND APPARATUS FOR ENABLING AND MANAGING APPLICATION INPUT/OUTPUT ACTIVITY WHILE RESTORING A DATA STORE

BACKGROUND OF THE INVENTION

1. Field of the Invention

Embodiments of the present invention generally relate to data protection systems and, more particularly, to a method and apparatus for enabling and managing application input/output activity while restoring a data store.

2. Description of the Related Art

In typical computing environments, small to large enterprises accumulate a significant amount of mission critical data related to various functions (e.g., business transactions, administration, resource management, manufacturing, services, and/or the like). The mission critical data may be stored in various storage devices and systems (e.g., tape drives, hard disk drives, RAID configurations and/or the like). The mission critical data may be backed up to the storage device and continuously monitored by various backup software programs.

These backup software programs may perform a backup process on the mission critical data at fixed and/or variable time intervals. During such a backup process, these backup software programs store copies of the mission critical data as volume images that corresponds with particular points-in-time. If one or more failures occur (e.g., a computer fault, a catastrophe, a natural disaster, corruption of one or more hardware and/or software programs and/or the like), such volume images are utilized to rollback and/or restore the mission critical data in order to achieve point-in-time consistency.

The mission critical data may be backed up in real time by employing one or more continuous data protection techniques. These continuous data protection technologies log each and every application input/output operation (e.g., write data, modify data, delete data and/or the like) performed on the mission critical data. The logs are indexed appropriately such that, on the occurrence of the failure, the mission critical data may be restored to any point in time by creation of a point in time image. During such a restoration, execution of concurrent application Input/Output (I/O) activity on the storage device is not permitted. The concurrent application I/O activity must also be logged so that the mission critical data may be restored any point in time due to subsequent failures. During a blackout window (i.e. duration in which an exact ordering of the application input/output activity cannot be determined), significant application I/O activity may be lost that hampers the restoration process as well as the achievement of point-in-time consistent mission critical data.

Therefore, there is a need in the art for a method and apparatus for enabling and directing application input/output activity while restoring a data store.

SUMMARY OF THE INVENTION

Embodiments of the present invention generally include a method and apparatus for enabling and managing application input/output activity while restoring a data store. In one embodiments, the method for enabling and managing application input/output activity in memory to restore a data store using one or more processors includes processing a restoration request for a data store, wherein the data store is mirrored by another data store, controlling application input/output activity associated with at least one host computer and directed to at least one of the data store or the other data store, restoring various portions of the data store, in accordance with the restoration request, using at least one of at least one prior point in time image or the other data store and servicing the application input/output communications using the data store.

In some embodiments, responses to the application input/output activity may be generated while the various portions of the data store may be restored in accordance with the restoration request. In some embodiments, the application input/output activity may be services after copying corresponding data blocks to the data store from the at least one of the at least one prior point in time image and the other data store. In some embodiments, the application input/output activity may be serviced after copying corresponding data blocks of the data store to an image data store and updating an index, wherein the index indicates a plurality of write operations.

In some embodiments, the restoring step and the servicing step may be performed in parallel. In some embodiments, a read data operation may be remapped to a location within an indexing data store. In some embodiments, at least one file system operation associated the application input/output activity may be executed, based on restore state information, using at least one of an image data store or a production data store. In some embodiments, the application input/output activity is directed to at least one of an image data store or a production data store. In some embodiments, the application input/output activity is split amongst a current-mirror data store and a production data store. In some embodiments, at least one data block is restored to the production data store prior to executing a write data operation. In some embodiments, a copy-on-write operation may be performed using the at least one portion of the production store. In some embodiments, the write data operation on the production data store may be executed without indexing.

In another embodiment, an apparatus for enabling and managing application input/output activity in memory to restore a data store using one or more processors includes means for processing a restoration request for a data store, wherein the data store is mirrored by another data store, means for controlling communication of application input/output activity associated with at least one host computer and directed to at least one of the data store or the other data store, means for copying one or more previous data blocks to various portions of the data store, in accordance with the restoration request, using at least one of at least one prior point in time image or the other data store and means for servicing the application input/output activity using the data store.

In some embodiments, the apparatus further includes means for generating responses to the application input/output activity while restoring the various portions of the data store in accordance with the restoration request. In some embodiments, the apparatus further includes means for servicing the application input/output activity after copying corresponding data blocks to the data store from the at least one of the at least one prior point in time image and the other data store. In some embodiments, the apparatus further includes means for redirecting a read data operation to an indexing data store.

In yet another embodiment, a computer-readable-storage medium comprising one or more processor-executable instructions that, when executed by at least one processor, causes the at least one processor to examine a restoration request for a data store, wherein the data store is mirrored by another data store, communicate application input/output activity associated with at least one host computer and directed to at least one of the data store or the other data store, restore various portions of the data store, in accordance with the restoration request, using at least one of at least one prior point in time image or the other data store and execute the application input/output activity using the data store.

In some embodiments, the one or more processor-executable instructions may examine the application input/output activity to identify a plurality of file system operations and execute the plurality of file system operations, based on restore state information, using at least one of an image data store or a production data store. In some embodiments, the one or more processor-executable instructions may remap a read data operation to a location within an indexing data store. In some embodiments, the one or more processor-executable instructions may perform the restoration of a production data store and the execution of a plurality of file system operations in parallel.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
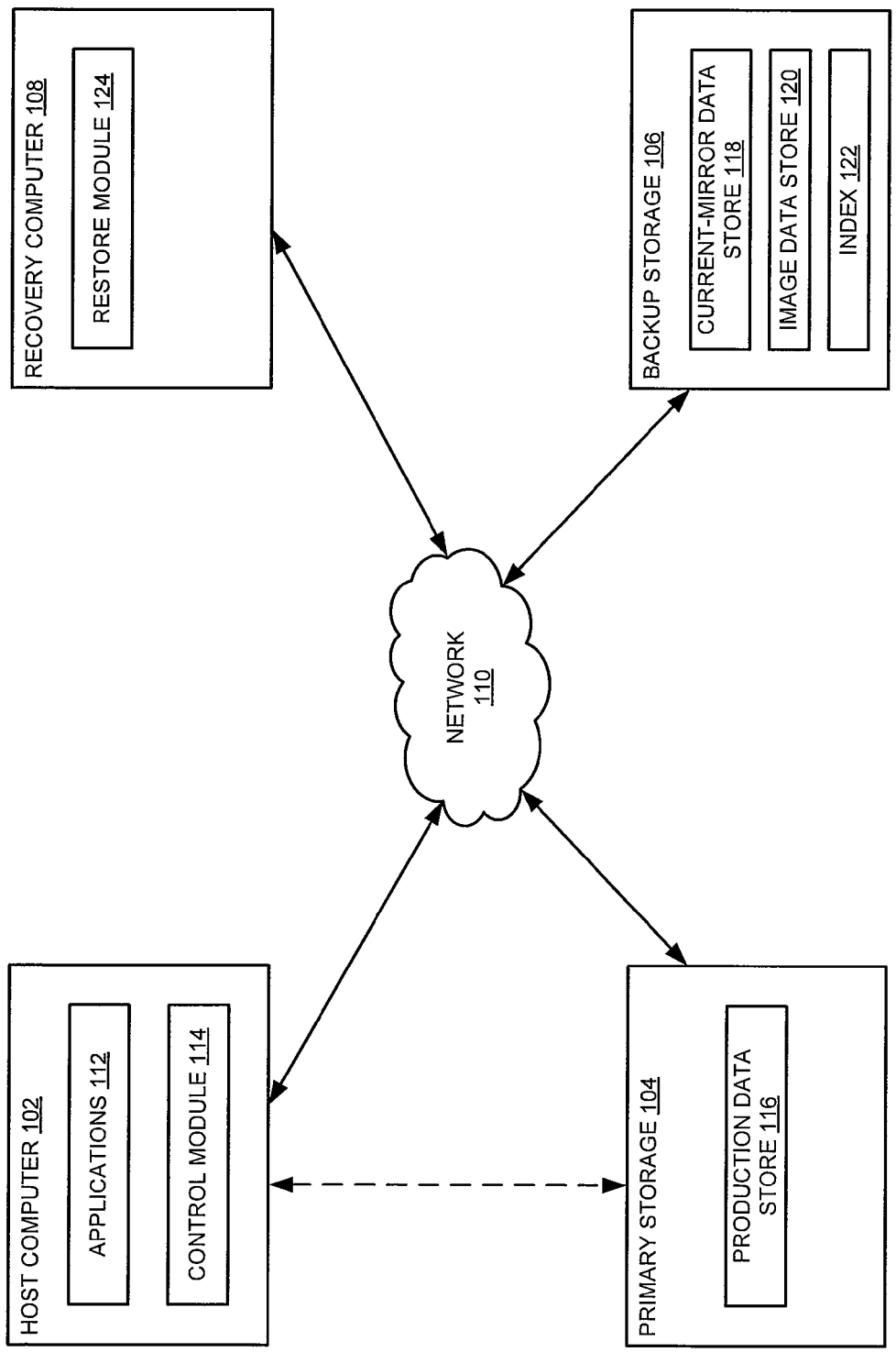
FIG. 1 is a block diagram of a system for enabling and managing application input/output activity while restoring a data store according to one or more embodiments.

As explained further below, various embodiments of the present disclosure illustrate a method and apparatus for enabling and managing application input/output activity while restoring a data store. In some embodiments, a computer (e.g., a host computer 102 of FIG. 1) may host various software applications for a plurality of users. Accordingly, these users access, modify and/or create data associated with these software applications. The computer stores such data as one or more volumes, which may form a data store (e.g., a production data store). In some embodiments, a recovery computer (e.g., a recovery computer 104 of FIG. 1) may configure another data store (e.g., a current-mirror data store 118 of FIG. 1) to mirror the data store. In some embodiments, the other data store may be indexed data store in which each and every write data operation is mapped to one or more data blocks.

In some embodiments, various software modules may record each and every write operation to the data store or the other data store in an index. A restore module (e.g., a restore module 420 of FIG. 4) may examine the index to identify a prior (e.g., most recent) point-in-time image from an image data store (e.g., an image data store 414 of FIG. 4) associated with an entire LUN, volume and/or file system. In some embodiments, the restore module may access a prior image of one or more data blocks and restore various portions of the production data store to a recovery point-in-time. After the restoration is complete, a service module (e.g., a service module 422 of FIG. 4) may resume normal execution of the application input/output activity. In some embodiments, the restoration of the production data store may be performed in parallel with servicing application input/output activity from the host computer. As such, the service module may restore one or more data blocks before executing a write data or a read data operation.

FIG. 1 is a block diagram of a system 100 for managing application input/output activity while restoring a data store according to one or more embodiments. In one or more embodiments, the system 100 includes a host computer 102, primary storage 104, backup storage 106 and a recovery computer 108, where each is coupled to each other through a network 110.

The host computer 104 may be a type of computing device (e.g., a laptop, a desktop and/or the like) known to one of ordinary skill in the art having the benefit of this disclosure. The host computer 104 may provide various services (e.g., application services, storage services and/or the like) to one or more computers (not shown). The host computer 104 includes various software packages, such as one or more applications 112 and a control module 114.

The primary storage 104 and the backup storage 106 may be types of storage systems that generally include various components (i.e., hardware and/or software) for managing storage resources. The primary storage 104 and/or the backup storage 106 may include one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for one or more computing devices, such as the host computer 102.

In some embodiments, the primary storage 104 includes a production data store 116 for storing one or more volumes that comprise a plurality of data blocks. In some embodiments, each portion of the production data store 116 may include one or more data blocks. The backup storage 104 includes a current-mirror data store 118, which mirrors the plurality of data blocks within the production data store 118. Furthermore, the image data store 120 includes one or more prior point-in-time images associated with the current-mirror data store 118. The backup storage 104 further includes an index 122, which stores metadata associated with the plurality of data blocks within the current-mirror data store 118 as explained in further detail below.

The recovery computer 108 may be a type of computing device (e.g., a laptop, a desktop and/or the like) known to one of ordinary skill in the art having the benefit of this disclosure. The recovery computer 108 includes various software packages, such as a restore module 124 as explained further below. In some embodiments, the recovery computer 108 may form a portion of a continuous data protection (CDP) appliance.

The network 110 comprises a communication system that connects computers by wire, cable, fiber optic and/or wireless link facilitated by various types of well-known network elements, such as hubs, switches, routers, and the like. The network 110 may employ various well-known protocols to communicate information amongst the network resources. For example, the network 110 may be a part of the Internet or Intranet using various communications infrastructure such as Ethernet, WiFi, WiMax, General Packet Radio Service (GPRS), and the like.

Figure 2:
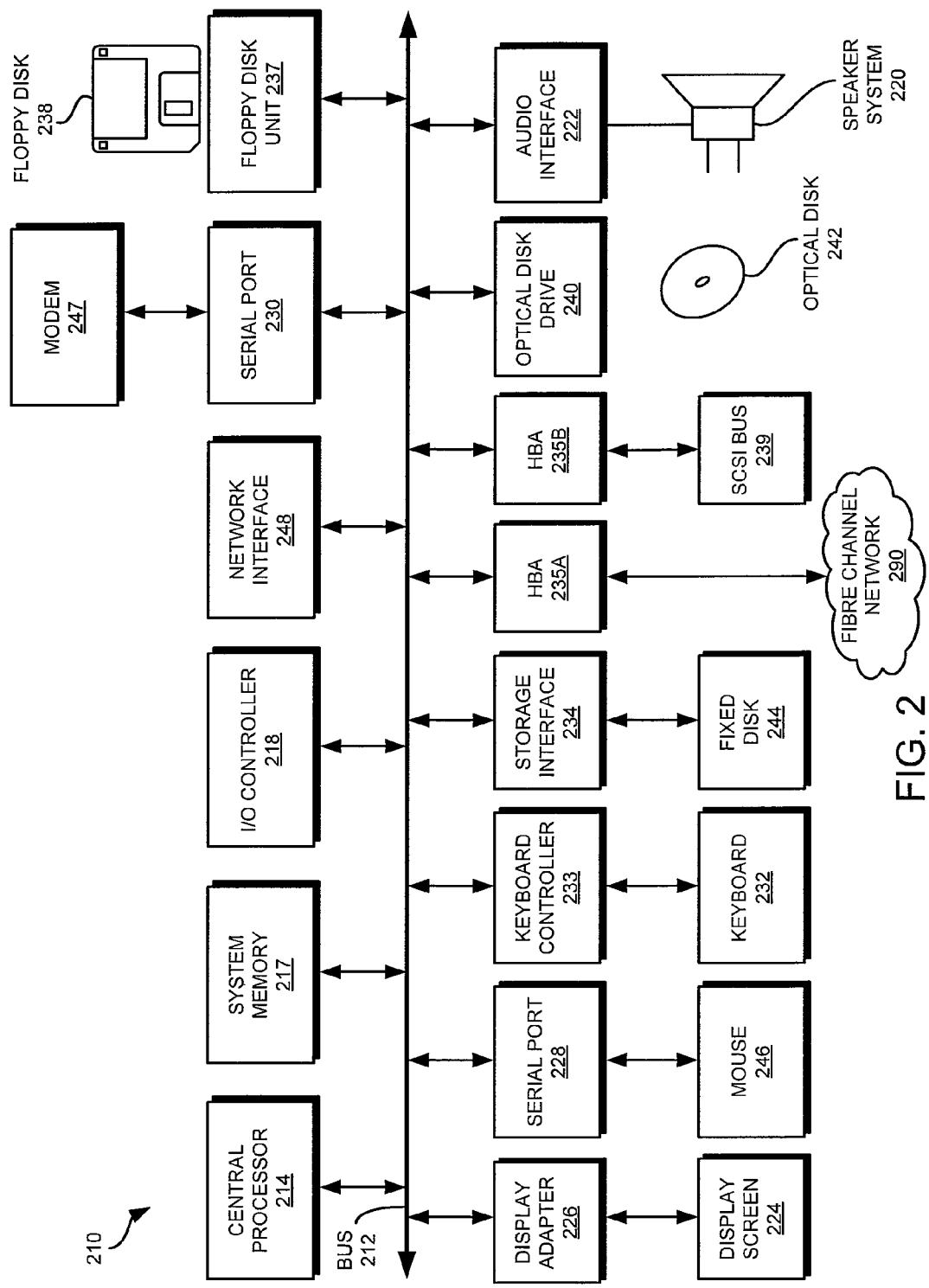
FIG. 2 is a block diagram of a suitable computer system for implementing the present disclosure, according to one or more embodiments.

FIG. 2 is a block diagram of a computer system 210 suitable for implementing the present disclosure. This system 210 is representative of a computer system that can be used to implement the host computer 102 and/or the recovery computer 104 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
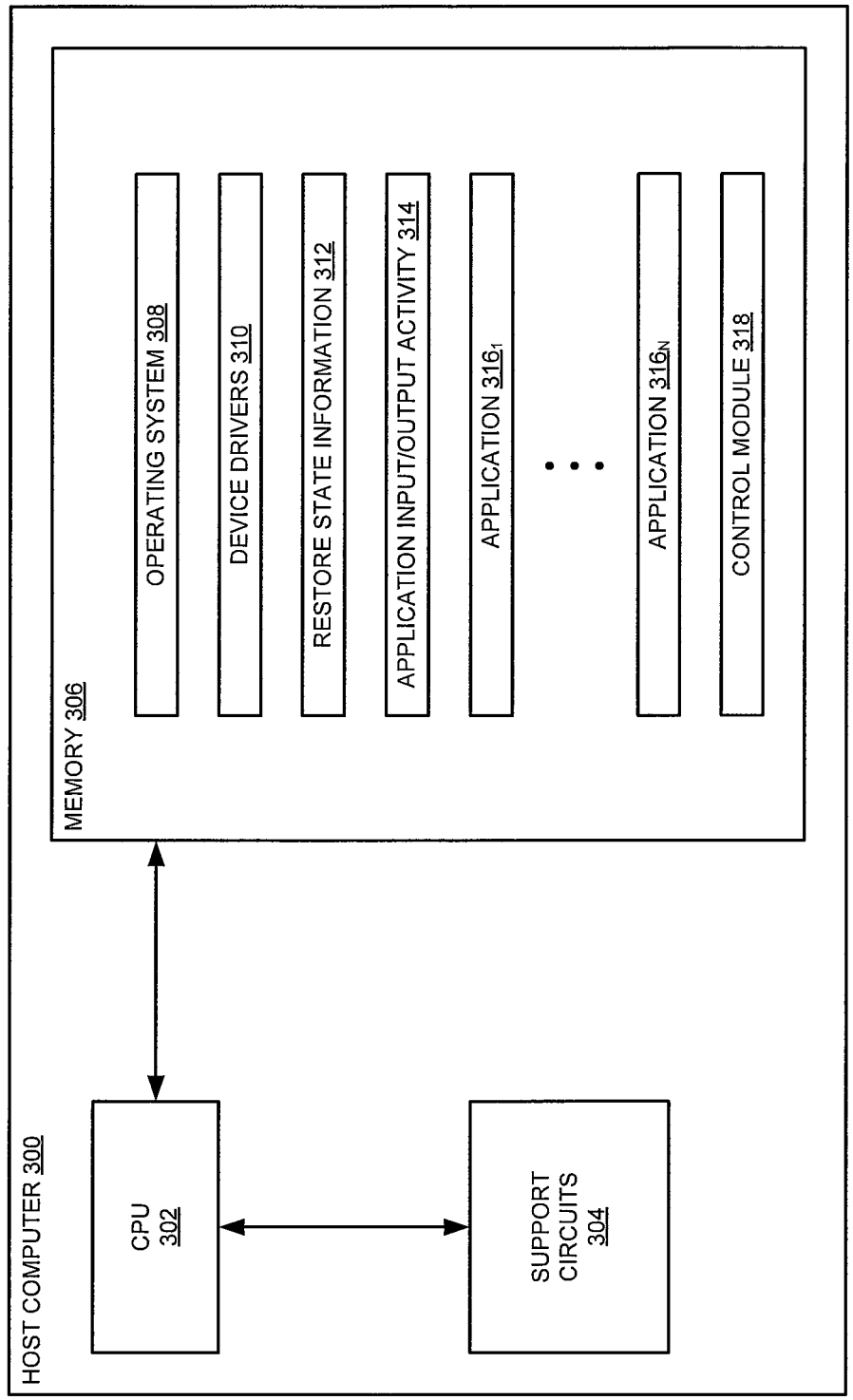
FIG. 3 is a block diagram of a host computer for enabling and managing application input/output activity while restoring a data store according to one or more embodiments.

FIG. 3 is a block diagram of a host computer 300 for enabling and managing application input/output activity while restoring a data store according to one or more embodiments.

The host computer 300 is a type of computing device (e.g., a laptop, a desktop and/or the like) that comprises a Central Processing Unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a Read Only Memory, Random Access Memory, disk drive storage, optical storage, removable storage, and the like. The memory 306 includes an operating system 308 and device drivers 310 as well as various data and software packages, such as restore state information 312, application input/output activity 314, a plurality of applications 316 and a control module 318.

The operating system 308 generally manages various computer resources (e.g., network resources, data storage resources, file system resources and/or the like). The operating system 308 is configured to execute operations on one or more hardware and/or software components, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a NIC card to communicate data to another computer as explained further below.

In some embodiments, the restore state information 312 may refer to a state associated with the production data store. For example, the restore state information 312 may indicate a state for various portions (i.e., one or more data blocks) of the application related data. In some embodiments, the restore state information 312 may also indicate an availability of such a restore state. As explained further below, data having an unavailable state undergoes a forced restoration.

The application input/output (I/O) activity 314 may refer to various operations (e.g., write data, read data, delete data and/or the like) for accessing and/or modifying application related data within a production data store (e.g., the production data store 116 of FIG. 1). In some embodiments, the application I/O activity 314 may be tracked in a memory region based bitmap. In some embodiments, the application I/O activity 314 may indicate one or more write and/or read operations on the production data store over a certain time period. The plurality of applications 316 (e.g., software applications, such as data recovery software programs, anti-virus software programs and/or the like) may initiate these read and/or write operations on the application related data. As explained further below, the plurality of applications 316 may communicate the application (I/O) activity 314 to the control module 318 in order to execute the one or more write and/or read operations.

Figure 4:
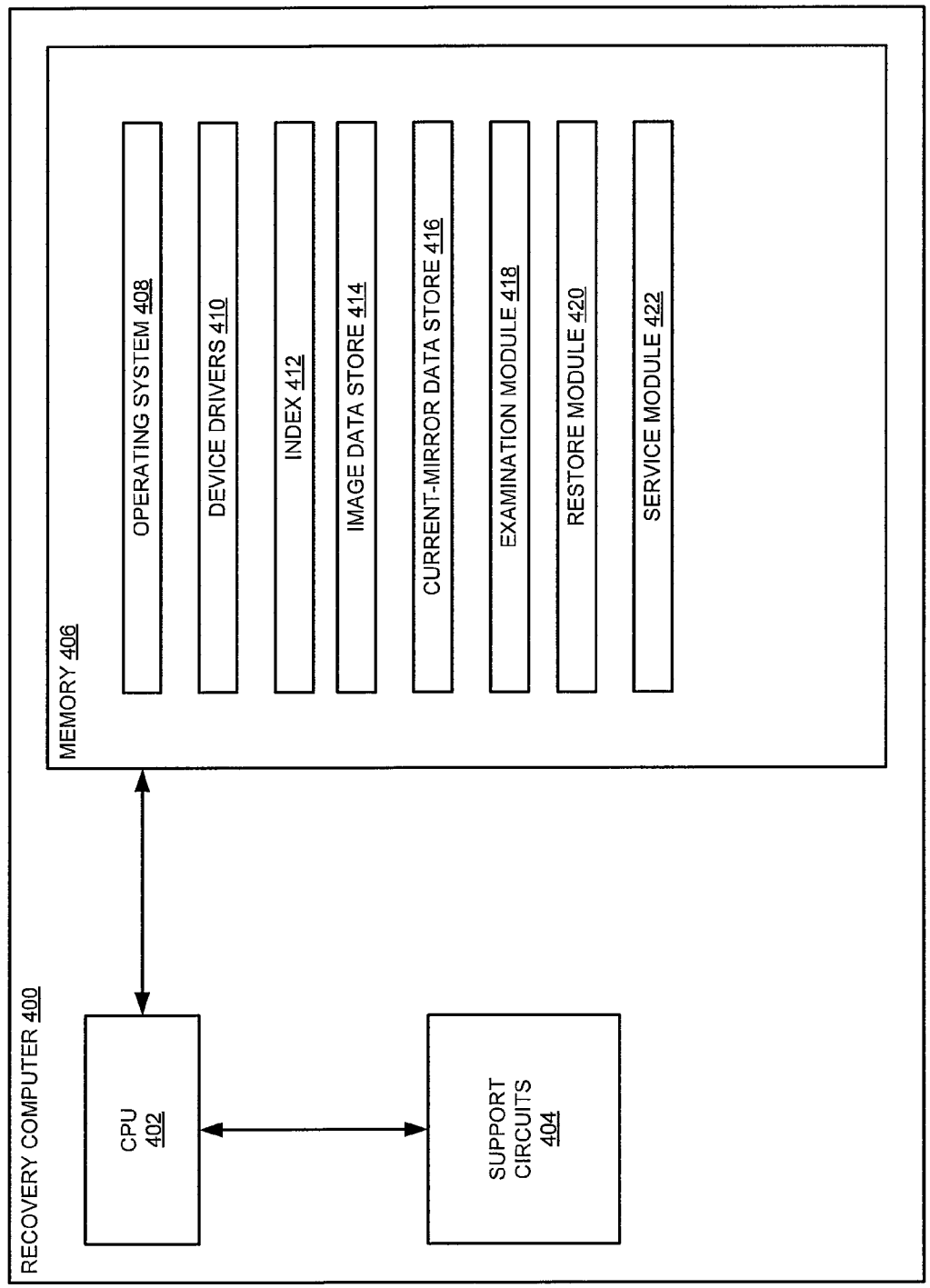
FIG. 4 is a block diagram of a recovery computer for enabling and managing application input/output activity while restoring a data store according to one or more embodiments.

In some embodiments, the control module 318 includes software code (e.g., processor executable instructions) for controlling the application input/output activity 314 that is directed to the production data store and/or a current-mirror data store (e.g., a current-mirror data store 416 of FIG. 4). In some embodiments, when the CPU 302 recalls the instructions of the control module 318 from the memory 306 and executes the control module 318, the CPU 302 performing the tasks associated with the control module 318, as recited above, form a means for controlling communication of the application input/output activity 314 to the production data store and/or the current-mirror data store. The control module 318 may direct the communication and performance of one or more file system operations (e.g., read data, write data and/or the like). In response to an unavailable restore state associated with one or more portions of the production data store, the control module 318 may restrain a particular read and/or write operation according to some embodiments, FIG. 4 is a block diagram of a recovery computer 400 for enabling and managing application input/output activity while restoring a data store according to one or more embodiments.

The recovery computer 400 is a type of computing device (e.g., a laptop, a desktop and/or the like) that comprises a Central Processing Unit (CPU) 402, various support circuits 404 and a memory 406. The CPU 402 may comprise one or more commercially available microprocessors or microcontrollers that facilitate data processing and storage. Various support circuits 404 facilitate operation of the CPU 402 and may include clock circuits, buses, power supplies, input/output circuits and/or the like. The memory 406 includes a Read Only Memory, Random Access Memory, disk drive storage, optical storage, removable storage, and the like. The memory 406 includes an operating system 408 and device drivers 410 as well as various data and software packages, such as an index 312, an image data store 414, a current-mirror data store 416, an examination module 418, a restore module 420 and a service module 422.

The operating system 408 generally manages various computer resources (e.g., network resources, data storage resources, file system resources and/or the like). The operating system 408 is configured to execute operations on one or more hardware and/or software components, such as Network Interface Cards (NICs), hard disks, virtualization layers, firewalls and/or the like. For example, the various software packages call commands associated with the operating system 408 (i.e., native operating system commands) to perform various file system and/or storage operations, such as creating files or metadata, writing data to the files, reading data from the files, modifying metadata associated with the files and/or the like. The operating system 408 may call one or more functions associated with the device drivers 410 to execute various file system and/or storage operations. As an example, the operating system 408 may utilize a device driver associated with a NIC card to communicate data to another computer as explained further below.

In some embodiments, the index 412 may include information indicating a plurality of write data operations to a production data store and/or the current-mirror data store 416 in sequential order. The index 412 may be a copy of an application input/output activity index that is maintained at a backed server. The operating system 408 may aggregate the plurality of write data operations into a timeline. Each of the plurality of write operations may be associated with a particular point-in-time along the timeline as well as extent information (e.g., an offset and a size) and/or storage system information (e.g., an Internet Protocol (IP) address and a LUN identifier).

In some embodiments, the image data store 414 may include volume images (e.g., snapshots) that correspond with the timeline indicated by the index 412. Each volume image may include data written to the production data store and/or the current-mirror data store 416 at a particular point-in-time. For example, the image data store 414 may include a circular buffer reflecting each and every write data operation on the production data store at various points-in-time. During the performance of each write data operation, a copy-on-write operation may be executed that writes one or more previous data blocks to the circular buffer. Then, one or more current data blocks are written to the production data store and/or the current-mirror data store 416. Hence, the one or more previous data blocks are overwritten. The index 412 may be updated to include information regarding the each write data operation as described in the present disclosure. Within the circular buffer, a pointer to a latest write data operation may also be updated.

In some embodiments, the current-mirror data store 416 may include an indexed mirror image of the production data store. As mentioned in the present disclosure, for each and every write data operation that is executed on the production data store, one or more data blocks are written to the current-mirror data store 416 to maintain an exact copy of current application related data. If a failure occurred that corrupted the production data store, the current-mirror data store 416 may be utilized to recover the current application related data. Similarly, the image data store 414 and the current-mirror data store 416 may be utilized to recover a previous point-in-time associated with the production data store.

In some embodiments, the examination module 418 may include software code (e.g., processor executable instructions) for examining one or more restoration requests for the production data store. In some embodiments, when the CPU 402 recalls the instructions of the examination module 418 from the memory 406 and executes the examination module 418, the CPU 402 performing the tasks associated with the examination module 418, as recited above, form a means for examining a restoration request for the production data store that is mirrored by the current-mirror data store 416. In some embodiments, the examination module 418 may identify a restore technique as well as a recovery point-in-time for the production data store and/or the current-mirror data store 416.

In some embodiments, the restore module 420 may include software code (e.g., processor executable instructions) for restoring various portions (e.g., data blocks) of the production data store in accordance with the restoration request. In some embodiments, when the CPU 402 recalls the instructions of the restore module 420 from the memory 406 and executes the restore module 420, the CPU 402 performing the tasks associated with the restore module 420, as recited above, form a means for restoring one or more data blocks of the production data store using a prior point-in-time image and/or the current-mirror data store 416. The restore module 420 may examine the index 412 to identify one or more write operations after a recovery point-in-time. For example, the restore module 420 may identify write data operations that were executed between the recovery point-in-time and a current point-in-time. Based on these write data operations, the restore module 420 identifies one or more changed data blocks within the production data store. The restore module 420 accesses a previous point-in-time volume image (e.g., snapshot) from the image data store 414 that is associated with each and every changed block and copies one or more previous data blocks to the production data store and/or the current-mirror data store 416.

In some embodiments, the service module 422 may include software code (e.g., processor executable instructions) for servicing the application input/output activity that is communicated to the recovery computer 400. In some embodiments, when the CPU 402 recalls the instructions of the service module 422 from the memory 406 and executes the service module 422, the CPU 402 performing the tasks associated with the service module 422, as recited above, form a means for servicing the application input/output activity using the production data store. The service module 422 may execute one or more file system operations, such as read data, delete data and write data operations, according to some embodiments. A control module (e.g., the control module 318) may communicate the one or more file system operations to the service module 422 as described in the present disclosure. The service module 422 generates responses to the application input/output activity while restoring the various portions of the production data store and/or the current-mirror data store in accordance with the restoration request.

Figure 5:
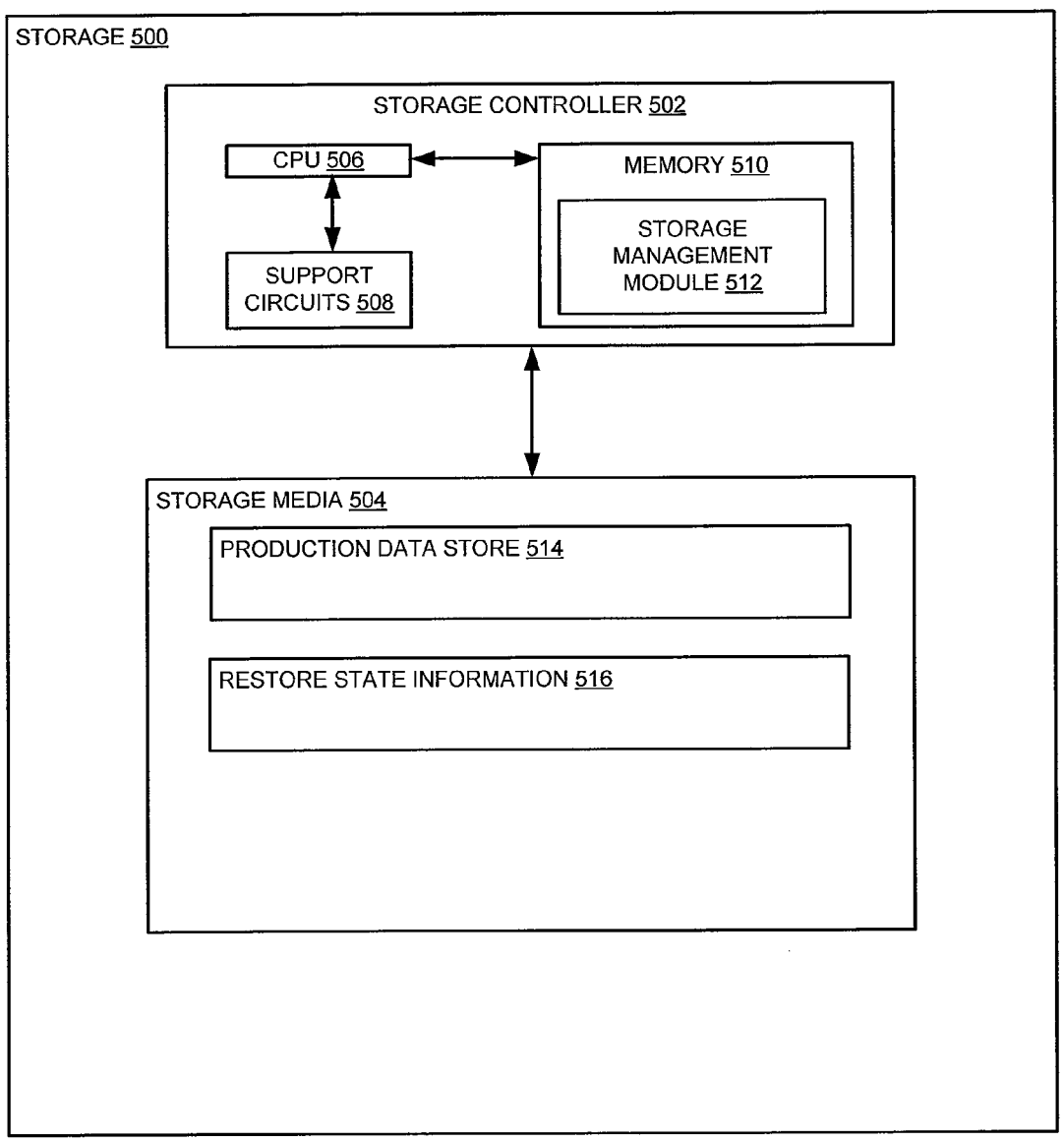
FIG. 5 is a block diagram of a storage system for enabling and managing application input/output activity while restoring a data store according to one or more embodiments.

FIG. 5 is a block diagram of a storage system 500 for enabling and managing application input/output activity while restoring a data store according to one or more embodiments. The storage system 500 generally includes various components (i.e., hardware and software) that are configured to manage storage resources.

The storage system 500 includes a storage controller 502 and storage media 504. The storage media 504 may include one or more data storage devices (e.g., hard disk drives, optical drives, magnetic tape drives, a storage array (e.g., a disk array in a RAID configuration) and/or the like). The storage controller 502 may include a CPU 506 (e.g., microcontroller or microprocessor), various support circuits 508 and memory 510. The storage controller 502 further includes storage management software 512 that creates an interface (e.g., Integrated Drive Electronics/AT Attachment (IDE/ATA), Small Computer Systems Interface (SCSI) and/or the like) to the one or more data storage devices for one or more computing devices (e.g., physical machines and/or virtual machines).

The storage system 500 facilitates persistent storage of computer data blocks (e.g., application related data) in the form of file system volumes. In one embodiment, the storage media 504 may include a production data store 514 (e.g., one or more LUNs) for maintaining point-in-time consistency for these file system volumes. In one embodiment, the production data store 514 may include application related data that corresponds with a particular point-in-time (e.g., a current point-in-time). As described in the present disclosure, a current-mirror data store (e.g., the current-mirror data store 416 of FIG. 4) may include a mirror image of the production data store 514. In some embodiments, the restore state information 516 may refer to the application related data within the production data store. In some embodiments, the restore state information 516 may include a restore state for one or more data blocks. The restore state, for example, may indicate whether the one or more data blocks are restored to a recovery point-in-time.

Figure 6:
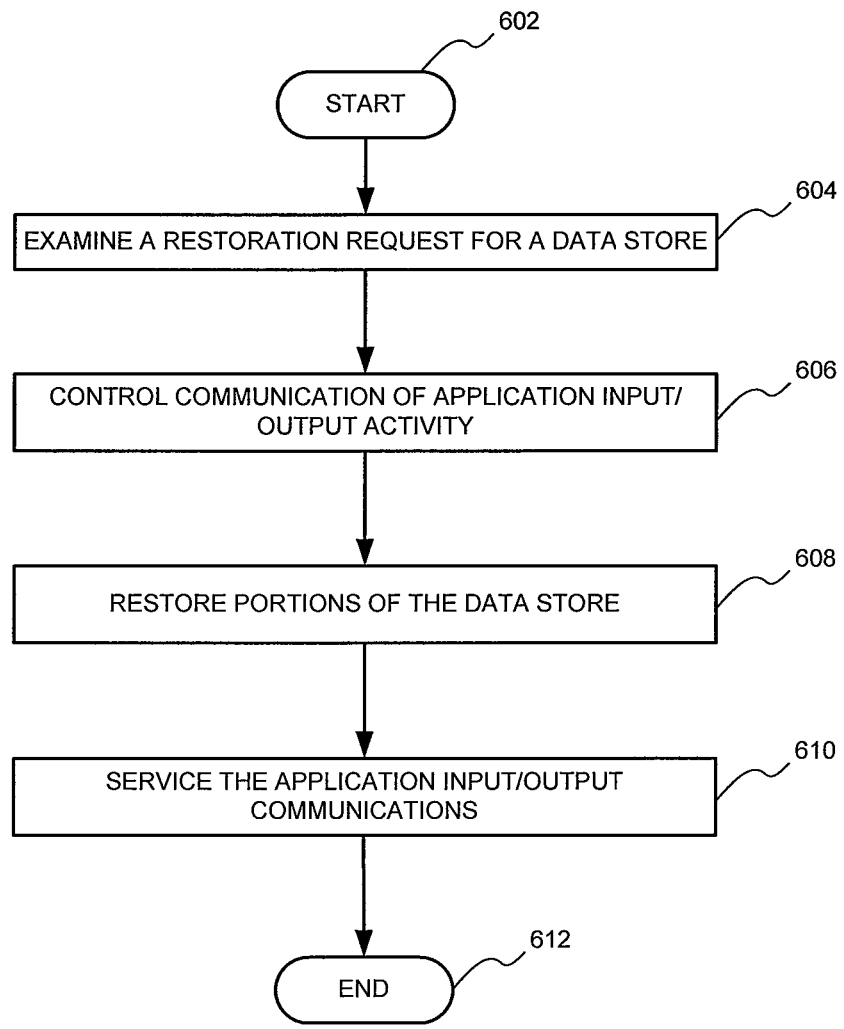
FIG. 6 is a flow diagram of a method for enabling and managing application input/output activity while restoring a data store according to one or more embodiments.

FIG. 6 is a flow diagram of a method 500 for enabling and managing application input/output activity while restoring a data store according to one or more embodiments. The method 600 starts at step 602 and proceeds to step 604.

At step 604, a restoration request for a data store is examined. The restoration request defines a restore technique to be performed on a production data store according to some embodiments. In some embodiments, an examination module stored in memory and executed by one or more processors examines the restoration request and determines the defined restore technique as well as a recovery point-in-time. A user and/or an administrator may initiate the restoration request after a failure at the production data store. A full restore, for example, may be requested if the production data store falls victim to a disaster that destroys all the application related data. A differential restore, on the other hand, may be employed if the production data store becomes reversibly corrupted.

At step 606, application input/output activity is controlled. In some embodiments, executing a control module stored in the memory causes the one or more processors to control the communication of the application input/output activity to the production data store and/or a current-mirror data store. In some embodiments, the control module blocks or restrains the communication of one or more file system operations (e.g., write data and/or read data operations) in order to permit the restoration of the production data store and/or the current-mirror data store as explained in further detail below.

At step 608, one or more portions of the data store are restored. In some embodiments, a restore module (e.g., the restore module 420 of FIG. 4) may utilize an index (e.g., the index 412 of FIG. 4) in order to rollback one or more write data operations that were executed after the recovery point-in-time. For each rolled back write data operation, the restore module copies one or more previous data blocks to the production data store using an image data store (e.g., the image data store 414 of FIG. 4). In some embodiments, the restore module identifies a most recent prior point-in-time volume image (e.g., a snapshot) and then, overwrites one or more data blocks on the production data store with the one or more previous data blocks. The restore module may also overwrite one or more corresponding data blocks on the current-mirror data store with the one or more previous data blocks to maintain a mirror image of the production data store.

At step 610, the application input/output activity is serviced. In some embodiments, a service module (e.g., the service module 422 of FIG. 4) executes one or more file system operations utilizing the production data store and/or the current-mirror data store after the restore module completes the restoration of the production data store. The service module, for example, may cooperate with the control module to write data, delete data and/or read one or more data blocks to the production data store and/or the current-mirror data store.

Before communicating a write data operation or a read data operations for one or more data blocks on the production data store, the control module may examine restore state information (e.g., the restore state information 312 of FIG. 3 and the restore state information 516 of FIG. 5) to determine whether the one or more data blocks are restored to the recovery point-in-time. If the control module determines that the one or more data blocks on the production data store are not restored to the recovery point-in-time, the control module instructs the service module to perform the restoration according to some embodiments.

Once the control module determines that the restore state is available, the control module instructs the service module to process the write data or the read data operation. In some embodiments, after the control module communicates the write data operation, the service module performs a copy-on-write operation on the one or more data blocks. In another embodiment, the service module maintains the write data operation in a temporary data store (e.g., scratch space) and delays execution until the restoration of the production data store completes. Alternatively, the service module executes the write data operation without updating an index (e.g., the index 412 of FIG. 4).

In some embodiments, after the control module communicates the read data operation, the service module generates a response that includes one or more requested data blocks. On the other hand, the service module remaps the read operations to a location within an image data store (e.g., the image data store 414 of FIG. 4) that includes the one or more requested data blocks according to some embodiments. For example, the service module may redirect the read data operation to the image data store if the production data store is not fully restored to the recovery point-in-time.

As explained in the present disclosure, the service module and the restore module may operate in parallel according to some embodiments. The service module, for example, may write data, delete data and/or read one or more data blocks while simultaneously restoring one or more data blocks on the production data store to the recovery point-in-time. In some embodiments, prior to the execution of the write data operation, the service module may instruct the restore module to restore one or more corresponding data blocks on the production data store.

In some embodiments, the restore module copies the one or more corresponding data blocks to the production data store from a prior point-in-time image within the image data store. In some embodiments, the restore module copies the one or more corresponding data blocks from the current-mirror data store to the production data store. Then, the service module performs a copy-on-write operation and updates the index. After the service module copies the one or more corresponding data blocks to the image data store, the service module executes the write data operation on the production data store. At step 612, the method 600 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method comprising:
   processing a restoration request, wherein
      the restoration request is a request to restore data of a data store, and
      the data store is mirrored by an other data store;
   controlling communication of information regarding application input/output activity, wherein
      the application input/output activity is associated with at least one host computer, and
      the application input/output activity is directed to at least one of
         the data store, or
         the other data store;
   selecting at least one prior point-in-time-image of a plurality of prior point-in-time-images, wherein
      the plurality of prior point-in-time-images is stored in an image data store,
      the selecting is based on the restoration request, and
      the selecting comprises examining an index, wherein
         the index comprises information identifying the application input/output activity;
   restoring a portion of the data of the data store, wherein
      the restoring is performed in accordance with the restoration request, and
      the restoring uses the at least one prior point-in-time image; and
   servicing the application input/output activity, wherein
      the servicing uses the data store, and the servicing and the restoring are performed in parallel.

2. The method of claim 1, wherein the restoring comprises:
   generating a response to the application input/output activity, wherein the generating is performed while the restoring is being performed.

3. The method of claim 1, further comprising:
   copying corresponding data blocks to the data store from at least one of the at least one prior point-in-time image and the other data store.

4. The method of claim 1, further comprising:
   copying corresponding data blocks of the data store to the image data store; and
   updating the index, wherein
      the index indicates a plurality of write data operations.

5. The method of claim 1, wherein the servicing comprises:
   remapping a read data operation to a location within an indexing data store.

6. The method of claim 1, wherein the controlling comprises:
   executing at least one file system operation, wherein
      the at least one file system operation is associated with the application input/output activity,
      the executing is based on restore state information, and
      the executing uses at least one of
         the image data store, or
         a production data store.

7. The method of claim 1, wherein the controlling comprises:
   directing the application input/output activity to at least one of the image data store or a production data store.

8. The method of claim 1, wherein the controlling comprises:
splitting the application input/output activity between a current-mirror data store and a production data store.

9. The method of claim 7, wherein the servicing comprises:
restoring at least one data block to the production data store, wherein
the at least one data block is restored to the production data store prior to executing a write data operation.

10. The method of claim 7, wherein the servicing comprises:
performing a copy-on-write operation using at least a portion of the production data store.

11. The method of claim 10, wherein the servicing comprises:
executing the copy-on-write operation on the production data store without updating the index.

12. An apparatus comprising:
a processor;
a computer-readable storage medium, coupled to the processor;
means for processing a restoration request, wherein
the means for processing is coupled to the processor,
the restoration request is a request to restore data of a data store,
the data store is stored in the computer-readable storage medium, and
the data store is mirrored by an other data store;
means for controlling communication of information regarding application input/output activity, wherein
the means for controlling is coupled to the processor,
the application input/output activity is associated with at least one host computer, and
the application input/output activity is directed to at least one of
the data store, or
the other data store;
means for selecting at least one prior point-in-time-images of a plurality of prior point-in-time-images, wherein
the plurality of prior point-in-time-images is stored in an image data store,
the selecting is based on the restoration request, and
the selecting comprises examining an index, wherein
the index comprises information identifying the application input/output activity;
means for restoring one or more previous data blocks to the data store, wherein
the means for copying is coupled to the processor,
the restoring is performed in accordance with the restoration request, and
the restoring uses the at least one prior point-in-time image; and
means for servicing the application input/output activity using
the means for servicing is configured to use the data store by virtue of being coupled to the computer-readable storage medium, and
the means for servicing and the means for restoring are configured to perform the servicing and the restoring in parallel.

13. The apparatus of claim 12, further comprising:
means for generating a response to the application input/output activity, wherein
the means for generating is configured to generate the response while the one or more data blocks are being copied to the data store.

14. The apparatus of claim 12, wherein
the means for servicing is configured to service the application input/output activity after the means for copying copies the one or more previous data blocks to the data store from the at least one of at least one prior point-in-time image and the other data store.

15. The apparatus of claim 12, further comprising:
means for redirecting a read data operation to an indexing data store.

16. A non-transitory computer readable storage medium comprising
one or more processor-executable instructions that, when executed by at least one processor, cause the at least one processor to
examine a restoration request, wherein
the restoration request is a request to restore data of a data store, and
the data store is mirrored by an other data store,
communicate information regarding application input/output activity, wherein
the application input/output activity is associated with at least one host computer, and
the application input/output activity is directed to at least one of
the data store, or
the other data store,
select at least one prior point-in-time-images of a plurality of prior point-in-time-images, wherein
the plurality of prior point-in-time-images is stored in an image data store,
selecting the at least one prior point-in-time image is based on the restoration request, and
selecting the at least one prior point-in-time image comprises examining an index, wherein
the index comprises information identifying the application input/output activity;
restore a portion of the data of the data store, wherein
the at least the portion of the data of the data store is restored in accordance with the restoration request, and
the at least the portion of the data of the data store is restored using
the at least one prior point-in-time image, and
execute the application input/output activity, wherein
the application input/output activity is executed using the data store, and
the one or more processor-executable instructions are configured to perform the restoration of the data store and the execution of the plurality of file system operations in parallel; and
a computer-readable storage medium, wherein the one or more processor-executable instructions are encoded in the computer-readable storage medium.

17. The non-transitory computer readable storage medium of claim 16, wherein the one or more processor-executable instructions further comprise one or more additional processor-executable instructions that, when executed by the at least one processor, cause the at least one processor to:
identify a plurality of file system operations by virtue of being configured to examine the application input/output activity; and
execute the plurality of file system operations, wherein
the plurality of file system operations are executed based on restore state information, and
the plurality of file system operations are executed using at least one of
the image data store, or
a production data store.

18. The non-transitory computer readable storage medium of claim 16, wherein the one or more processor-executable instructions further comprise one or more additional processor-executable instructions that, when executed by the at least one processor, cause the at least one processor to:
  remap a read data operation to a location within an indexing data store.

19. The method of claim 1, further comprising:
  determining which of the at least one prior point-in-time image and the other data store is to be used for the restoring.

20. The method of claim 1, wherein
  the restoring uses the other data store.

21. The method of claim 1, wherein the application input/output activity comprises:
  copying data to a buffer, wherein
    the data is copied from at least one of
      the data store, or
      the other data store, and
    the image data store comprises the buffer.

* * * * *